UNITED STATES PATENT OFFICE.

CARLETON ELLIS, OF MONTCLAIR, NEW JERSEY.

EDIBLE PRODUCT AND PROCESS OF MAKING SAME.

1,417,893.  Specification of Letters Patent.  Patented May 30, 1922.

No Drawing.  Application filed December 16, 1918. Serial No. 266,933.

*To all whom it may concern:*

Be it known that I, CARLETON ELLIS, a citizen of the United States, and a resident of Montclair, in the county of Essex and State of New Jersey, have invented certain new and useful Improvements in Edible Products and Processes of Making Same, of which the following is a specification.

This invention relates to an oily composition which may be employed as an edible product which consists of or contains a refined petroleum oil of the nature of Russian petroleum oil or similar American made product suited for human consumption such as is used for medicinal purposes, incorporated with hydrogenated oil. Preferably a sufficient amount of hard fat or hydrogenated oil is added to produce a composition of the consistency of butter or lard. For this purpose from 20 to 40% of hard fat may be employed if desired. Ordinarily I prefer to use a major proportion of the medicinal oil in the composition. Preferably the materials are incorporated by heating, the hydrogenated oil being melted and then mixed with the paraffin oil. Then the latter is preferably chilled by exposing in a thin layer to a cold surface.

A suitable proportion is 35 parts by weight of the paraffin oil and 15 parts of hardened cotton oil of melting point about 60° C. The hard oil is melted and incorporated with white medicinal paraffin oil which may be warmed somewhat. The hot fatty material is allowed to solidify on a chill roll and may then be agitated or beaten to whiten by the introduction of air in fine globules.

Petroleum oil of a higher or heavier nature than ordinary Russian petroleum, Nujol and the like may be employed provided it is adapted for human consumption. Hydrogenated corn, cottonseed, peanut, soya bean, sesame or other vegetable fatty products or hydrogenated animal oils may be used as desired in the composition.

Such a product being made from paraffin oil and hard fat, both of which are relatively unaffected by atmospheric elements, affords a fatty composition adapted for edible and especially medicinal purposes which, as stated, may be produced of the consistency of lard or butter and may be used as a shortening or frying fat or for other cooking purposes.

When making a butter-like composition out of the fatty material of the consistency of butter fat, the materials may be churned with sour milk to produce a butter-like flavor. The latter may be improved by the addition of say 2–4% of butyric gylceride to the oil to increase its tendency to absorb such flavors from the sour milk as will tend to make the flavor more nearly resemble that of ordinary butter. The product may be colored by means of an oil-soluble butter color to produce a yellow or orange tint. The presence of water in such a composition is not objectionable as the fat does not quickly become rancid but may be kept for an indefinite time, in contra-distinction to most butter or oleomargarine. If desired the water may be removed and an anhydrous or nearly anhydrous buttery composition obtained.

While the invention is described with reference to the use of medicinal petroleum or mineral oil and hydrogenated fat, other bodies may be added, such as unhydrogenated animal or vegetable oils, beef stearine and the like, in some cases. Semi-solid products or fats of a stiffer consistency may be produced as desired. I have found that hydrogenated fat of fairly high melting point will solidify more than its own weight of the petroleum oil without objectionable crystallization or segregation. The expected incompatibility does not obtain.

The product is especially useful as a means of administering medicinal oil in a palatable form by incorporation in various foods as a shortening, etc. For adipose persons, this product enables the employment of a shortening, frying material, butter substitute and the like, which does not have the same tendency to form fatty tissue and to cause excessive body warmth, such as is attributed to animal and vegetable greases.

What I claim is:—

1. As an edible product a composition consisting substantially of a highly refined mineral oil adapted for human consumption, incorporated with hard hydrogenated fatty oil, in such proportions as to produce a consistency resembling a soft fat, such composition containing a percentage of water.

2. As an edible product a composition containing a highly refined mineral oil adapted for human consumption, incorporated with hard hydrogenated fatty oil, in such proportions as to produce a consistency resembling soft fat.

3. A composition comprising medicinal petroleum oil, hydrogenated oil, butyric glyceride and water, said composition having a consistency from that of butter fat to that of lard.

CARLETON ELLIS.